US010747950B2

(12) United States Patent
Dang et al.

(10) Patent No.: US 10,747,950 B2
(45) Date of Patent: Aug. 18, 2020

(54) AUTOMATIC INSIGHTS FOR SPREADSHEETS

(71) Applicant: Microsoft Technology Licensing, LLC., Redmond, WA (US)

(72) Inventors: Yingnong Dang, Bellevue, WA (US); Shusen Liu, Beijing (CN); Xiao Liang, Beijing (CN); Haidong Zhang, Beijing (CN); Jim Sun, Sammamish, WA (US); Dongmei Zhang, Bellevue, WA (US); Scott Ruble, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 325 days.

(21) Appl. No.: 15/115,439

(22) PCT Filed: Jan. 30, 2014

(86) PCT No.: PCT/CN2014/071837
§ 371 (c)(1),
(2) Date: Jul. 29, 2016

(87) PCT Pub. No.: WO2015/113301
PCT Pub. Date: Aug. 6, 2015

(65) Prior Publication Data
US 2017/0177559 A1 Jun. 22, 2017

(51) Int. Cl.
*G06F 40/18* (2020.01)
*G06F 40/40* (2020.01)
(Continued)

(52) U.S. Cl.
CPC .............. *G06F 40/18* (2020.01); *G06F 40/40* (2020.01); *G06Q 10/063* (2013.01); *G06Q 30/0201* (2013.01)

(58) Field of Classification Search
CPC .............................. G06F 17/211; G06F 17/246
See application file for complete search history.

(56) References Cited

U.S. PATENT DOCUMENTS 6,581,068 B1 * 6/2003 Bensoussan ...... G06F 16/24539
7,991,672 B2 * 8/2011 Crowder ................ G06Q 40/06
705/36 R
(Continued)

FOREIGN PATENT DOCUMENTS

| CN | 101089846 A | 12/2007 |
|---|---|---|
| CN | 101556606 A | 10/2009 |

(Continued)

OTHER PUBLICATIONS

Semi-structured data extraction and modelling: the WIA Project as available Oct. 1, 2013, pp. 1-8.*
(Continued)

*Primary Examiner* — Scott T Baderman
*Assistant Examiner* — Mario M Velez-Lopez
(74) *Attorney, Agent, or Firm* — Merchant & Gould P.C.

(57) ABSTRACT

Automatically identifying insights from a dataset and presenting the insights graphically and in natural language text ranked by importance is provided. Different data types and structures in the dataset are automatic recognized and matched with a corresponding specific analysis type. The data is analyzed according to the determined corresponding analysis types, and insights from the analysis are automatically identified. The insights within a given insight type and between insight types are ranked and presented in order of importance in automatically generate charts that visually describe each insight and in natural language text that describes each insight in such a way that it may be understandable to a general audience who may not have a familiarity with statistics.

16 Claims, 10 Drawing Sheets

(51) Int. Cl.
G06Q 10/06 (2012.01)
G06Q 30/02 (2012.01)

(56) References Cited

U.S. PATENT DOCUMENTS

| | | | |
|---|---|---|---|
| 8,365,212 B1 | 1/2013 | Orlowski | |
| 10,133,767 B1* | 11/2018 | Cole | G06F 16/2322 |
| 10,198,346 B1* | 2/2019 | Cole | G06F 11/3688 |
| 10,331,657 B1* | 6/2019 | Cole | G06F 16/2365 |
| 2004/0080514 A1* | 4/2004 | Dorwart | G06F 17/246 |
| | | | 345/581 |
| 2006/0036964 A1* | 2/2006 | Satterfield | G06F 3/0481 |
| | | | 715/777 |
| 2006/0061547 A1* | 3/2006 | Bramwell | G06Q 10/06 |
| | | | 345/156 |
| 2008/0229244 A1* | 9/2008 | Markus | G06F 17/30867 |
| | | | 715/811 |
| 2008/0297513 A1 | 12/2008 | Greenhill et al. | |
| 2009/0313283 A1* | 12/2009 | Conradi | G06F 16/252 |
| 2013/0007034 A1* | 1/2013 | Lu | G06Q 10/06 |
| | | | 707/769 |
| 2013/0185619 A1 | 7/2013 | Ludwig | |
| 2013/0275905 A1* | 10/2013 | Bhaskaran | G06F 16/26 |
| | | | 715/771 |
| 2014/0019088 A1* | 1/2014 | Leonard | 702/178 |
| 2014/0156649 A1* | 6/2014 | Bhattacharjee | G06F 16/24578 |
| | | | 707/723 |
| 2015/0347372 A1* | 12/2015 | Waldman | G06F 17/246 |
| | | | 715/220 |
| 2016/0350950 A1* | 12/2016 | Ritchie | G06T 11/206 |

FOREIGN PATENT DOCUMENTS

| | | |
|---|---|---|
| CN | 102147816 A | 8/2011 |
| CN | 102184258 A | 9/2011 |
| CN | 102193940 A | 9/2011 |
| CN | 102314633 A | 1/2012 |
| CN | 102483776 A | 5/2012 |
| CN | 102681834 A | 9/2012 |
| CN | 102981702 A | 3/2013 |
| WO | 03010679 A1 | 2/2003 |

OTHER PUBLICATIONS

"Search Report Issued in European Patent Application No. 14881128.4", dated Nov. 8, 2016, 4 Pages.

"Office Action Issued in European Patent Application No. 14881128.4", dated Nov. 17, 2016, 7 Pages.

"Second Office Action Issued in Chinese Patent Application No. 201480074451.8", dated Jun. 11, 2019, 8 Pages.

"First Office Action Issued in Chinese Patent Application No. 201480074451.8", dated Feb. 1, 2019, 6 Pages.

"International Search Report and Written Opinion Issued in PCT Application No. PCT/CN2014/071837", dated Oct. 27, 2014, 13 Pages.

"Third Office Action and Search Report Issued in Chinese Patent Application No. 201480074451.8", dated Feb. 6, 2020, 19 pages.

"Preparing Excel Data with Insight Workbench", Retrieved on: Dec. 10, 2013, Available at: https://www.predixionsoftware.com/predixion/help/Walkthrough%201%20-%20Preparing%20Excel%20Data%20with%20Insight%20Workbench.html#hs-inthistopic-fe79d4e5-64d2-4900-8dba-d14a49cd758b.

Brath, et al., "Spreadsheet Validation and Analysis through Content Visualizatio", In Proceedings of European Spreadsheet Risks Interest Group, Feb. 29, 2008, pp. 10.

Kandel, et al., "Research Directions in Data Wrangling: Visualizations and Transformations for Usable and Credible Dat", In Proceedings of Information Visualization—Special issue on State of the Field and New Research Directions archive, vol. 10, Issue 4, Oct. 2011, pp. 18.

"Minitab 16", Published on: Jul. 25, 2013, Available at: ittp://www.minitab.com/en-/products/minitab/default.aspx#0.

"IBM Cognos Insight", Published on: Sep., 2012, Available at: http://www.consist.com.ar/ar/web/uploads/productos/gpa/ibm-cognos-insight.pdf.

"Tableau Desktop", Published on: Feb. 16, 2011, Available at http://www.tableausoftware.com/products/desktop.

"Excel Analyze. What's New in Excel", Retrieved on: Dec. 10, 2013, Available at: http://office.microsoft.com/en-in/excel/.

"Metric Insights to exhibit at the NoSQL Now! Conference & Exp", Published on: Feb. 16, 2013, Available at: http://www.metricinsights.com/metiric-insights-to-exhibit-at-the-nosql-now-conference-expo/.

"Google Charts", Published on: Aug. 8, 2013, Available at: https://developers.google.com/chart/interactive/docs/customizing_tooltip_content.

"Adding Annotations to a Chart", Retrieved on: Dec. 10, 2013, https://support.google.com/drive/answer/2382313?hl+en.

Hermans, et al., "Automatically Extracting Class Diagrams from Spreadsheets", In the Proceedings of the 24th European Conference on Object-Oriented Programming, Jun. 21, 2010, 30 pages.

"Automated Insights", Retrieved on: Jan. 6, 2014 Available at: http://www.automatedinsights.com/.

\* cited by examiner

| | A | B | C | D | E |
|---|---|---|---|---|---|
| 1 | YEAR | MONTH | MANUFACTURING | RETAIL SALES | TRANSPORT |
| 2 | 2022 | Jan | 89.5 | 118.9 | 104 |
| 3 | 2022 | Feb | 84.9 | 112 | 170 |
| 4 | 2022 | Mar | 101.1 | 121.2 | 98 |
| 5 | 2022 | Apr | 93.8 | 128.7 | 96 |
| 6 | 2022 | May | 108.9 | 199 | 104 |
| 7 | 2022 | Jun | 107.9 | 138.3 | 97 |
| 8 | 2022 | Jul | 113.8 | 140.2 | 102 |
| 9 | 2022 | Aug | 74.5 | 128.3 | 130 |
| 10 | 2022 | Sep | 100.6 | 131.5 | 96 |
| 11 | 2022 | Oct | 8.3 | 112 | 27 |
| 12 | 2022 | Nov | 88.3 | 121.2 | 98 |
| 13 | 2022 | Dec | 95.2 | 100 | 103 |
| 14 | 2023 | Jan | 19 | 20 | 169 |
| 15 | 2023 | Feb | 21 | 55 | 144 |
| 16 | 2023 | Mar | 28 | 75 | 147 |
| 17 | 2023 | Apr | 41 | 77 | 142 |
| 18 | 2023 | May | 41 | 69 | 142 |

Insights:
- In 2023, Manufacturing and Retail Sales increased steadily from month to month
- In 2023, Transport decreased moderately from month to month.
- In September of 2022, Manufacturing dropped sharply by -87%
- In May of 2022, Retail Sales increased sharply by 57%

AUTOMATIC INSIGHTS FOR SPREADSHEETS

CROSS-REFERENCE TO RELATED APPLICATION

This application is a National Stage Application of PCT/CN2014/071837, filed 30 Jan. 2014, and which application is incorporated herein by reference.

BACKGROUND

Modern day computer and computer software users use a variety of software applications to perform various tasks, for example, to write, calculate, draw, organize, prepare presentations, send and receive electronic mail, make music, and the like. A user may utilize a spreadsheet application to process and manipulate data, and using spreadsheet functions, to perform many simple to very complex calculations and organizational functions with their data.

A spreadsheet application is oftentimes used for data analysis; however many of today's tools are manual, meaning that users have to stipulate what type of data they are feeding in and what type of analysis they wish to perform. In addition, users may potentially need to edit their data to conform to the needs of the tool (e.g. rearrange their data into a form recognizable by the tool, express data in a specific format, etc.).

Some users may experience challenges when trying to identify insights from their data. For example, a dataset may include noisy and/or incomplete data. Noisy data, such as outliers and missing data may make it difficult for a common user to determine meaningful analysis data (e.g., an average value, trend line, etc.).

A common user may be required to have a certain knowledge base of the application's capabilities and may require a series of complicated steps to perform certain operations. Many common users may have a limited knowledge of principles of statistical graphics or data analysis, which may make it difficult for him/her to identify important insights. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by automatically identifying insights from a dataset and presenting the insights ranked by importance. Embodiments provide for an automatic recognition of different data types and structures (e.g., numerical dataset, time series, ordinal series, hierarchies, categories, etc.), and an automatic matching of these data types and structures with specific analysis types that correspond to them. The automatic recognition may be resilient to errors in the data (e.g. missing values, outliers, etc.) and diversity in the formatting of the data (e.g. the multitude of ways that date/time can be expressed, the different ways that a hierarchy can be laid out, etc.).

The data may be automatically analyzed according to the determined corresponding analysis types, and insights from the analyses may be automatically identified. An analysis may yield a large number of insights with varying strengths. Embodiments comprise a ranking system operable to determine the strongest insights within a given insight type (e.g., correlations, linear trends, etc.), and also determine rankings of insights between insight types. Accordingly, a list of insights spanning various insight types and in order of determined importance may be generated.

Embodiments may comprise an insights presentation engine operable to automatically generate charts that visually describe each insight and natural language text that describes each insight in such a way that it may be understandable to a general audience who may not have a familiarity with statistics. According to embodiments, each chart may be tailored to showcase a specific insight rather than depicting the entire dataset. The text may include headers and values sourced for the user's own data.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Embodiments of the present invention are directed to automatically identifying insights from a dataset and presenting the insights graphically and in natural language text ranked by importance. As described briefly above, different data types and structures in a dataset may be automatically recognized and matched with corresponding specific analysis types. The dataset may be analyzed according to the determined corresponding analysis types, and insights from the analyses may be automatically identified. The insights within a given insight type and between insight types may be ranked and presented in order of importance in automatically generated charts that visually describe each insight and in natural language text that describes each insight in such a way that it may be understandable to a general audience who may not have a familiarity with statistics.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Figure 1:
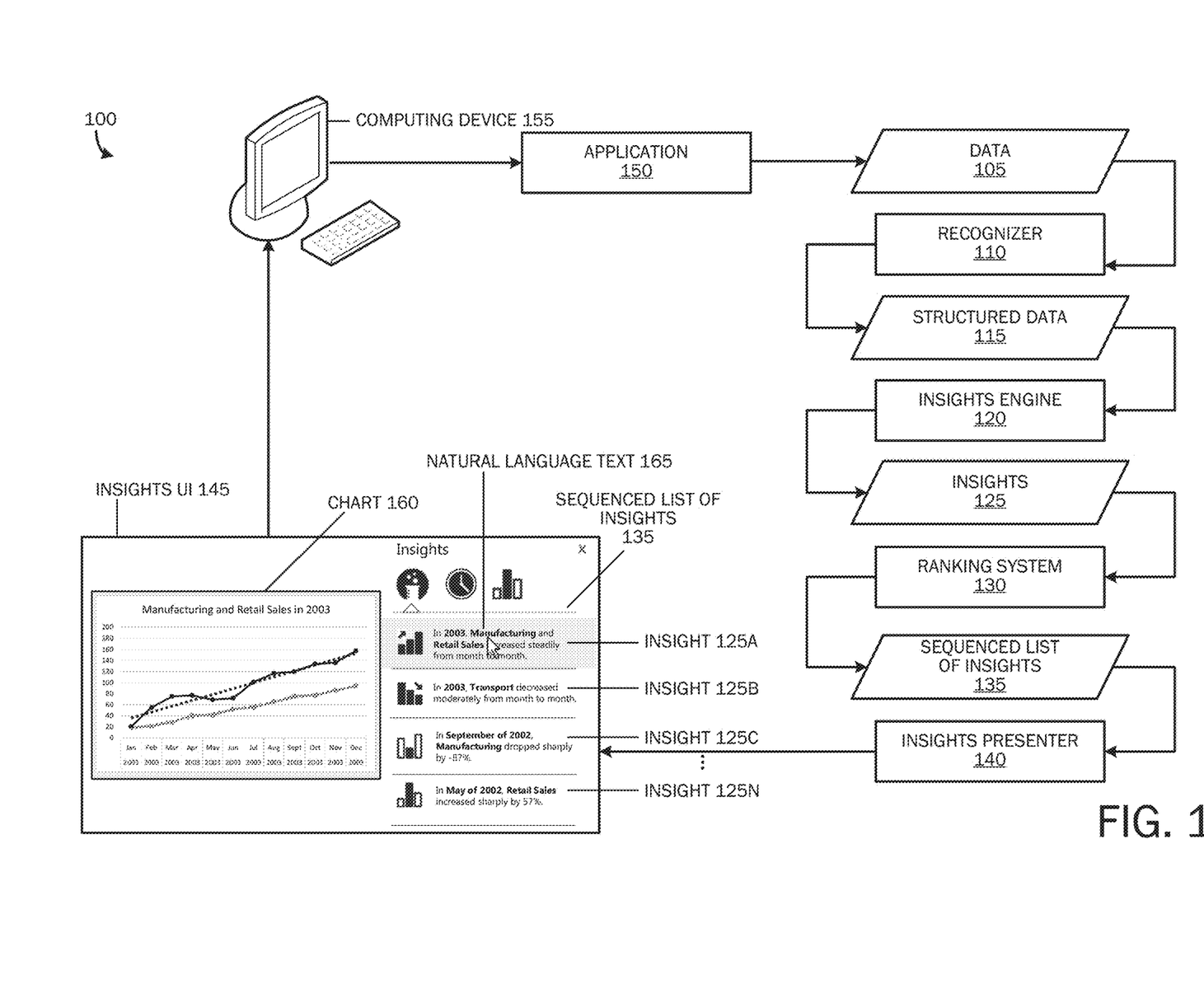
FIG. 1 is a block diagram of one embodiment of a system for automatically identifying insights from a dataset and presenting the insights ranked by importance.

Referring now to the drawings, in which like numerals represent like elements, various embodiments will be described. FIG. 1 is a block diagram illustrating a system architecture 100 for automatically identifying insights from a dataset and presenting the insights ranked by importance. The system architecture 100 includes a computing device 155. The computing device 155 may be one of a variety of suitable computing devices described below with reference to FIGS. 4 through 6. For example, the computing device 155 may include a tablet computing device, a desktop computer, a mobile communication device, a laptop computer, a laptop/tablet hybrid computing device, a gaming device, or other type of computing device for executing applications 150 for performing a variety of tasks.

The application 150 illustrated in association with computing device 155 is illustrative of any application having sufficient computer executable instructions for enabling embodiments of the present invention as described herein. For example, application 150 may include spreadsheet applications, word processing applications, slide presentation applications, electronic mail applications, notes taking applications, desktop publishing applications, and the like. An example spreadsheet application 150 includes Excel® manufactured by Microsoft Corporation of Redmond, Wash. As should be appreciated, this example spreadsheet application is but one example of the many applications suitable for enabling embodiments described herein.

Applications 150 may include thick client applications, which may be stored locally on the computing device 155, or may include thin client applications (i.e., web applications) that may reside on a remote server and accessible over a network, such as the Internet or an intranet. A thin client application may be hosted in a browser-controlled environment or coded in a browser-supported language and reliant on a common web browser to render the application executable on a computing device 155.

The system architecture 100 includes a recognizer 110 configured to perform operations relating to parsing input data 105, recognizing different data types and structures, and automatically matching these data types and structures with specific analysis types that correspond to them. According to embodiments, the input data 105 may be semi-structured data that may be obtained from a spreadsheet application 150 or other data source. The data 105 may be comprised of data points in a matrix of data cells.

According to embodiments, the recognizer 110 may be operable to parse the input data 105 and generate a structured dataset 115 such as numerical datasets, time series, ordinal series, hierarchies, categories, etc. The recognizer 110 may be operable to recognize data types such as time series, hierarchical data, categories, etc. The recognizer 110 may also be operable to determine whether a column (or row) containing numerical data is metric or non-metric. For example, a table in a spreadsheet may comprise a column of student IDs represented by identification numbers. A determination may be made by the recognizer 110 that while the values are numeric, they should not be aggregated, and thus may be recognized as non-metric. The automatic recognition may be resilient to errors in the data 105 (e.g. missing values, outliers, etc.) and diversity in the formatting of the data (e.g. the multitude of ways that date/time can be expressed, the different ways that a hierarchy can be laid out, etc.). The recognizer 110 may recognize time series data out of a semi-structured data sheet, wherein a time series data may be defined as a set of numerical values driven by a series of time which has equal intervals (e.g., 1 day, 2 weeks, 3 months, 5 years, etc.). The recognizer 110 may be operable to recognize time series data from data sheets of various formats (e.g., contains one year only, combines two columns/headers to form a time series, etc.). Many spreadsheets may be in a complex structure that can be formulated into a hierarchy structure. The recognizer 110 may be operable to extract complex structures from semi-structured input data 105 and formulate the data 105 into hierarchical-structured data 115. The recognizer 110 may be further operable to recognize categories within input data 105. For example, the recognizer 110 may recognize a column or row in a table of data 105 may be a category, such as brands of cars.

The system architecture 100 includes an insights engine 120 configured to perform operations relating to receiving and analyzing the structured data 115 and generating insights 125 based on the analyses. The insights engine 120 may be operable to generate insights associated with various types of structured data 115 such as, but not limited to, single numerical datasets, single time series, correlation between two time series, correlation among multiple time series, a hierarchy, a category, etc.

One type of insight 125 that may be generated from a single numerical dataset may include determining whether a dataset 105 comprises a missing data point. Oftentimes, there may be missing data points in an input dataset 105. The corresponding cells of these missing data points may be empty or filled with a special number (e.g., 0, −1, −999, etc.). The insights engine 120 may be operable to detect such empty cells or special numbers, and determine if a specific data point is a missing data point.

Another type of insight 125 that may be generated from a single numerical dataset 115 may include calculating a robust average value of a numerical dataset. An average value is a basic insight about a numerical dataset; however, directly calculating the average value of all data points (excluding any missing data points) may generate a misleading result due to the possibility of outliers which skew a calculated average value. Accordingly, according to an embodiment, the insights engine 120 may use a trimmed mean statistical measure to calculate a robust average value (i.e., a mean value of a numerical dataset excluding the biggest x % and smallest x % values).

The insights engine 120 may be operable to automatically identify if a numerical dataset 115 comprises any outlier data points. According to an embodiment, the insights engine 120 may calculate a trimmed standard deviation of a dataset, wherein the biggest x % and the smallest x % values are excluded. Robust outliers may be obtained by determining all values outside of a predetermined interval, for example: [TM−3*TS,TM+3*TS], wherein TM=trimmed mean and TS=trimmed standard deviation. The number of outliers in a dataset 115 may be used to determine an importance of an outlier type insight 125.

Outliers may lead to a skewed distribution of a numerical dataset 115, which may result in a poor visualization of a common histogram. Accordingly, the insights engine 120 may incorporate a range histogram, which intelligently partitions a skewed distribution into a plurality of segments, wherein each segment has a normal distribution. According to an embodiment, the insights engine 120 may be able to automatically identify if two or more arbitrary distributions are similar.

The insights engine 120 may be further operable to generate insights 125 associated with single time series. According to embodiments, insights 125 of numerical datasets 115 as described above may also apply to time series datasets 115. In addition, the following types of insights 125 may be identified for single time series: spikes, jumps, robust linear trend with outliers, segments with different variants, etc.

A spike in a time series may be identified when a value in a local range is significantly high or low compared with its neighboring data points. A jump in a time series may be identified when an average value of a time series significantly changes at a specific time point. A linear trend of a time series may be detected with consideration on potential outliers.

The insights engine 120 may utilize a robust linear regression algorithm to detect if there is a linear trend for a time series. The algorithm may be insensitive to outliers. If a linear trend is identified, outliers may be detected against residuals between the time series and the regressed linear trend.

The insights engine 120 may be operable to identify segments in a time series with different ranges of variations. For example, the range of variation of a time series may change, which may reflect the stability of a time series.

Sometimes, two time series may have similar evolution patterns (e.g., the value of two time series increase or decrease simultaneously). The insights engine 120 may be operable to identify if two time series are correlated. According to an embodiment, robust linear regression may be utilized, and two time series may be determined to be correlated if the residual of the robust linear regression is small. According to another embodiment, correlation coefficients (e.g., Pearson correlation) may be calculated to detect if two time series may be related.

As described above, the insights engine 120 may further be operable to detect correlation among multiple time series. The insights engine 120 may detect all correlated time series pairs and then perform clustering to detect possible correlations.

As described above, the insights engine 120 may be operable to generate insights associated with a hierarchy of data. To gain insights from a hierarchy with numerical attributes associated with each node, the insights engine 120 may determine the difference of the sum value of all children across parent nodes, the difference of the variance of all children across parent nodes, and the difference of the average value of all children across parent nodes.

Also as described above, the insights engine 120 may be operable to generate insights associated with a category of data. To gain insights from a category, the insights engine 120 may determine a sum of the values across a given category value.

For a given dataset, 115, there may be a plurality of insights. Even a small dataset can yield a large number of insights of varying strengths. Presenting all identified insights 125 to a user may be overwhelming to the user. Accordingly, the system 100 may comprise a ranking system 130 operable to rank the identified insights 125 within a given insight type (e.g., correlations, linear trends, etc.) and also between different insight types. For example, the ranking system 130 may be operable to compare the strength of a correlation insight with the strength of a linear trend insight to determine which insight 125 should come before the other in a sequenced list of results.

Some insights 125 results may be considered fairly strong and significant, while other insights may be considered not as strong and significant. For example, an outlier that is very high above the mean (e.g., 2.5 standard deviations above the mean) may be considered a very strong finding, versus an outlier that falls within 2 standard deviations of the mean. The ranking system 130 may parse through the insights 125 identified by the insights engine 120, determine the strongest findings via mathematical definitions, then rank the strongest insights across the various insight types. Accordingly, a sequenced list 135 of insights 125 may be generated.

The system architecture 100 includes an insights presenter 140 configured to perform operations relating to generating a chart 160 visually describing each insight 125 and generating natural language text 165 describing each insight 125 in a descriptive textual string. The chart(s) 160 and natural language text 165 may be provided, and may be presented in an insights user interface (UI) 145 as will be described in more detail with respect to FIGS. 2A-D.

Figure 2A:
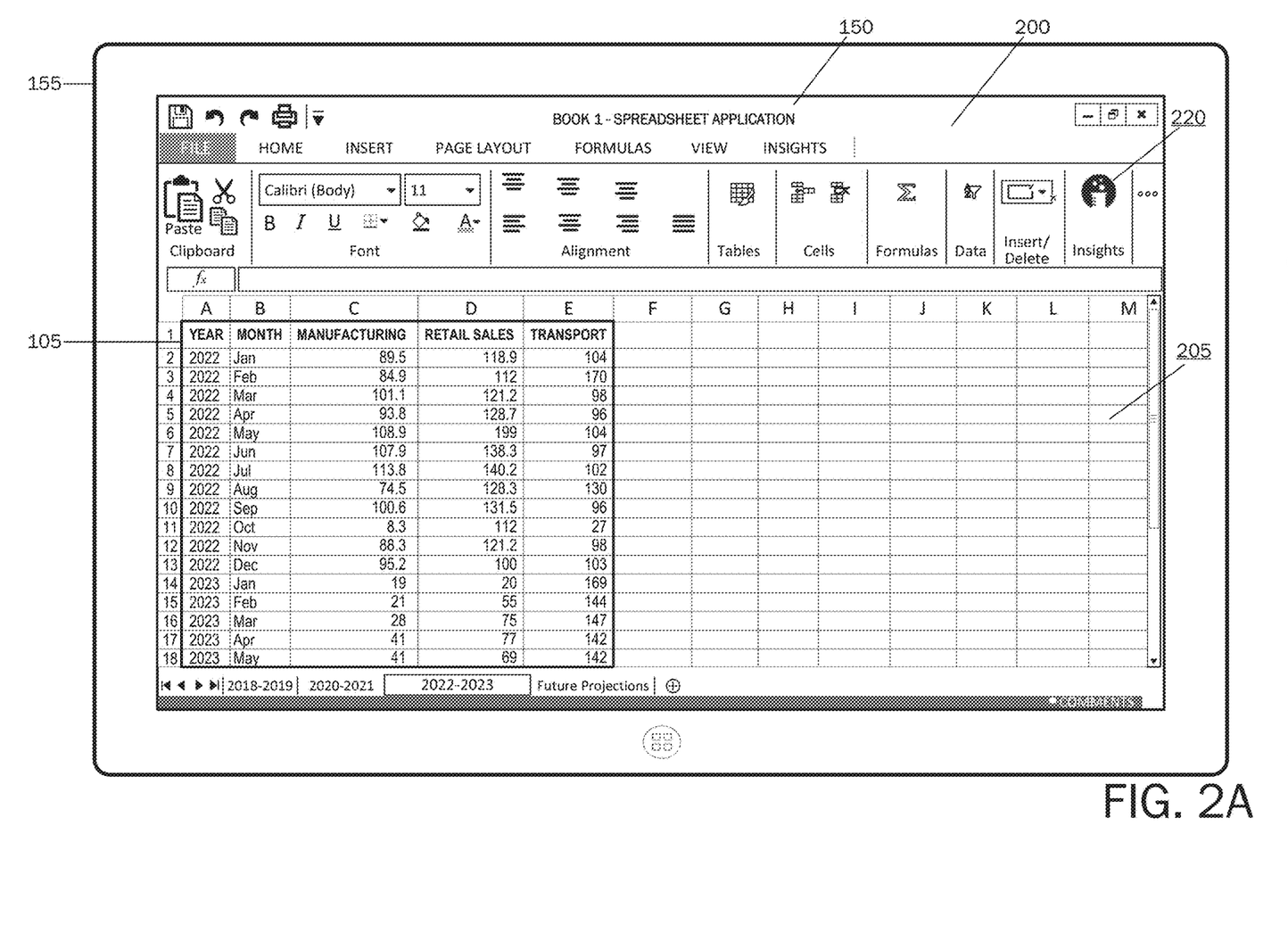
FIG. 2A is an illustration of an example spreadsheet application user interface comprising a dataset.

Referring now to FIG. 2A, an example spreadsheet application user interface 200 and spreadsheet document 205 are illustrated that may be displayed on any suitable computing device 155 described above. According to embodiments, user interaction with the electronic spreadsheet user interface 200 and spreadsheet document 205 may be accomplished via a variety of interaction methods including keyboard entry, mouse entry, gesture entry, voice command, eye tracking, thin air gesture entry, electronic inking entry, and/or combinations thereof. The electronic spreadsheet user interface 200 and spreadsheet document 205 are for purposes of example and illustration only and are not exhaustive of the variety of types of documents that may contain data for which embodiments of the present invention may be utilized. For example, while embodiments described herein discuss automatically identifying insights from a dataset and presenting the insights in association with data contained in a spreadsheet application document 205, other software applications and associated documents, for example, word processing documents, slide presentation documents, electronic mail documents, notes documents, and the like that are capable of receiving displaying and allowing operation of spreadsheet-type functions may be utilized in accordance with embodiments of the present invention.

Referring still to FIG. 2A, the example spreadsheet user interface 200 includes data 105, which may be a semi-structured dataset. In the example spreadsheet document 205, the data 105 is data sheet comprising a matrix of data cells containing data of a monthly trend of manufacturing, retail sales, and transport from years 2022-2023. According to embodiments, an insights functionality control 220 may be provided which when selected may automatically extract the data 105 and derive and rank insights 125 from the data 105.

Figure 2B:
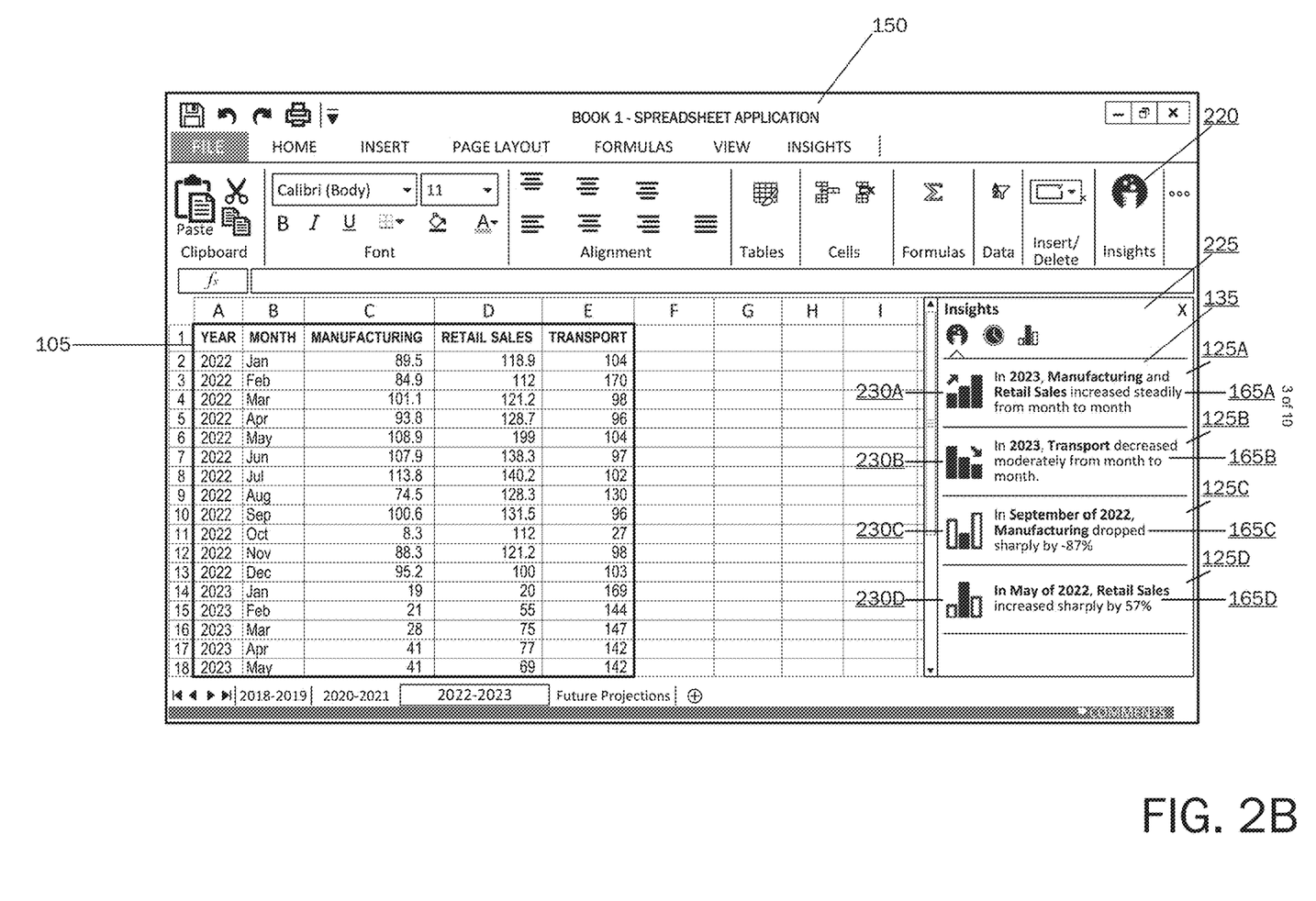
FIG. 2B is an illustration of an example spreadsheet application user interface comprising a listing of insights.

Referring now to FIG. 2B, the derived and ranked insights 125 are shown displayed in an insights task pane 225. According to an embodiment, the sequenced listing of insights 135 may dynamically change in response to a selection of data 105 in the spreadsheet 205. Each insight 125A-N in the list 135 may be represented by a natural language text string 165A-N describing the specific insight. The natural language text 165 may explain the insight 125 in plain terminology such that it may be understandable to a general audience who may not have a familiarity with statistics. The natural language text 165 may include text sourced from the data 105. According to an embodiment, a descriptive string for a trend insight type may be: "<time_duration>, <column_names> <degree_of_change> from <time_granularity>." For example, the first insight 125A comprises natural language text string 165A "In 2023, Manufacturing and Retail Sales increased steadily from month to month."

Additionally, each insight 125A-N may comprise an icon 230A-N descriptive of the insight type (e.g., an increasing, decreasing, or stable trend, a peak or valley, a positive or negative correlation between variables, etc.). For example, the first insight 125A comprises an icon 230A showing an increasing trend.

Figure 2C:
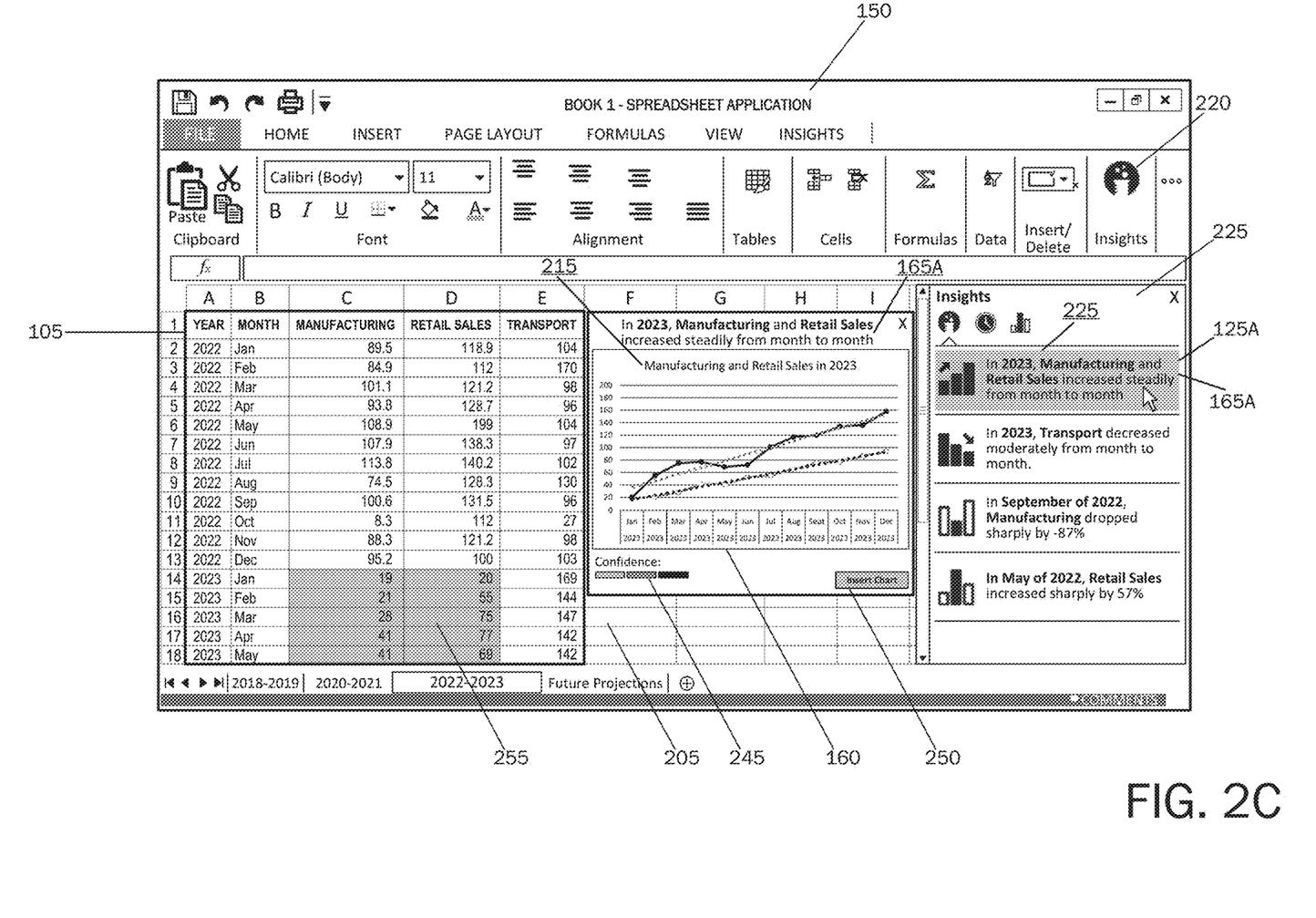
FIG. 2C is an illustration of an example spreadsheet application user interface where an insight is selected and displayed as a graph.

Interaction with an insight 125 is illustrated FIG. 2C. As shown, on mouse hover or selection, an insight 125 may be highlighted 210. In addition, the range of cells 255 in the spreadsheet 205 to which the insight 125 pertains may be highlighted. Additionally, on mouse hover or selection, an automatically generated chart 160 that best exemplifies the insight 125 may be displayed. The chart 160 may comprise trend lines, shapes, annotations, or other added features that help make the insight 125 more intuitive, and may also include confidence level data 245 pertaining to an insight 125. Each insight 125 may have one or more charts 160 that showcase the particular insight.

As an example and as illustrated in FIG. 2C, a trend-type insight 125 may be expressed with a line chart 160, where the x-axis may span the duration of the trend and may be delimited by the time granularity (e.g., year to year, month to month, day to day, etc.), and the y-axis is the value range of the variable. The line chart 160 may also include a linear trend line that fits the slope of the observed trend. The chart 160 may comprise a title 215 that may be a concatenation of the variable column name(s) (e.g., "Manufacturing" and "Retail Sales") and a statement of time (e.g., "2023," "2020-2022," "May-September," etc.).

Figure 2D:
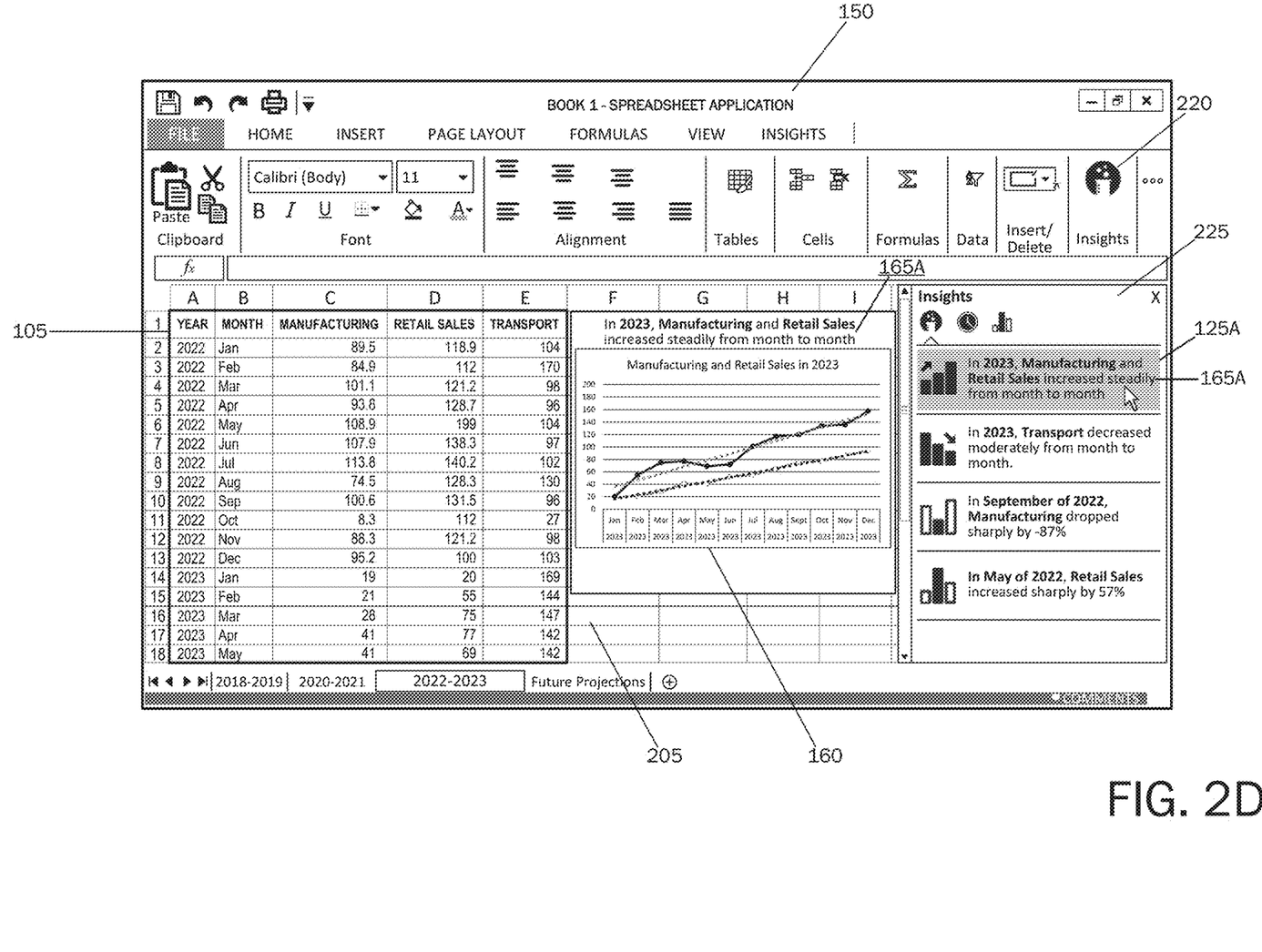
FIG. 2D is an illustration of an example spreadsheet application user interface where the graph is inserted into the spreadsheet.

If a user wishes to insert a chart 160 associated with an insight 125 into the spreadsheet 205, he/she may select an insert chart functionality control 250. Accordingly, the chart 160 may be instantiated as a chart in the spreadsheet 205 as illustrated in FIG. 2D.

Figure 3:
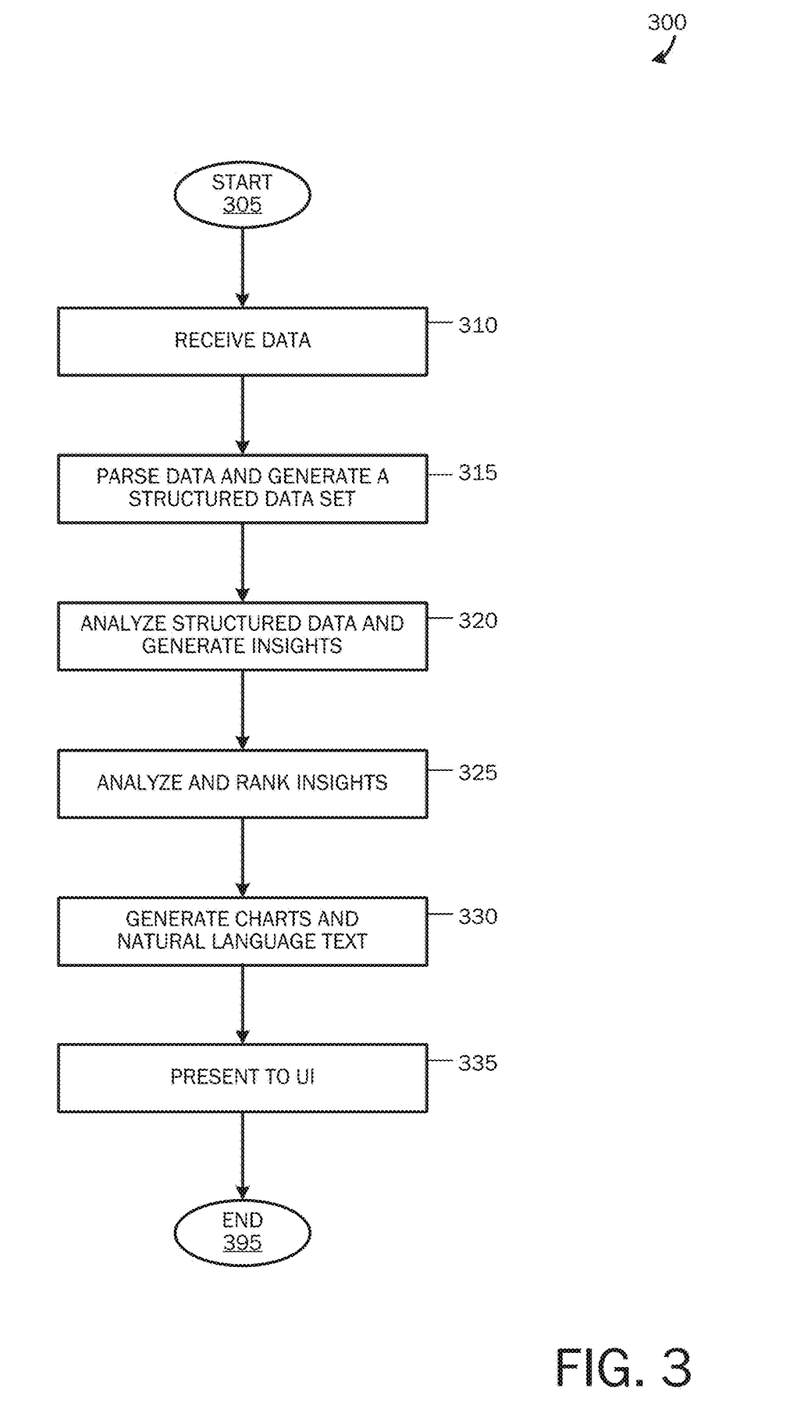
FIG. 3 is a flow chart of a method for automatically identifying insights from a dataset and presenting the insights ranked by importance.

FIG. 3 is a flow chart showing one embodiment of a method 300 for automatically identifying insights from a dataset and presenting the insights ranked by importance. The method 300 starts at OPERATION 305 and proceeds to OPERATION 310, where data 105 is received. As described above, the received data 105 may be semi-structured data that may be obtained from a spreadsheet application 150 or other data source. According to an embodiment, the data 105 may be extracted and populated into the recognizer 110 when an indication of a selection of an insights functionality control 220 is received.

The method 300 may proceed to OPERATION 315, where the data 105 may be parsed and converted into a structured dataset 115. According to an embodiment, OPERATION 315 may be performed by the recognizer 110. As described above, the data 105 may be structured into a numerical dataset, a time series, an ordinal series, a hierarchy, a category, or other type of structured dataset 115.

The method 300 may proceed to OPERATION 320, where the structured data 115 may be analyzed according to analysis types that correspond with the data types and structures, and insights 125 may be identified. For example, for a numerical dataset, the insights engine 120 may automatically identify if any data points are outlier data points.

The method 300 may proceed to OPERATION 325, where identified insights 125 may be analyzed and ranked in order of importance. As described above, the ranking system 130 may be operable to rank the identified insights 125 within a given insight type (e.g., correlations, linear trends, etc.) and also between different insight types. For example, the ranking system 130 may be operable to compare the strength of a correlation insight with the strength of a linear trend insight to determine which insight 125 should come before the other in a sequenced list of insights 135.

The method 300 proceeds to OPERATION 330, where a chart 160 visually describing each insight 125 and natural language text 165 describing each insight 125 in a descriptive textual string may be generated. At OPERATION 335, the chart(s) 160 and natural language text 165 may be presented in an insights user interface (UI) 145. The insights 125 may be presented in a sequenced order by importance as determined by the ranking system 130. A user may be able to scroll through and view the various insights 125, and selectively insert one or more insights 125 into the spreadsheet 205. The method may end at OPERATION 395.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
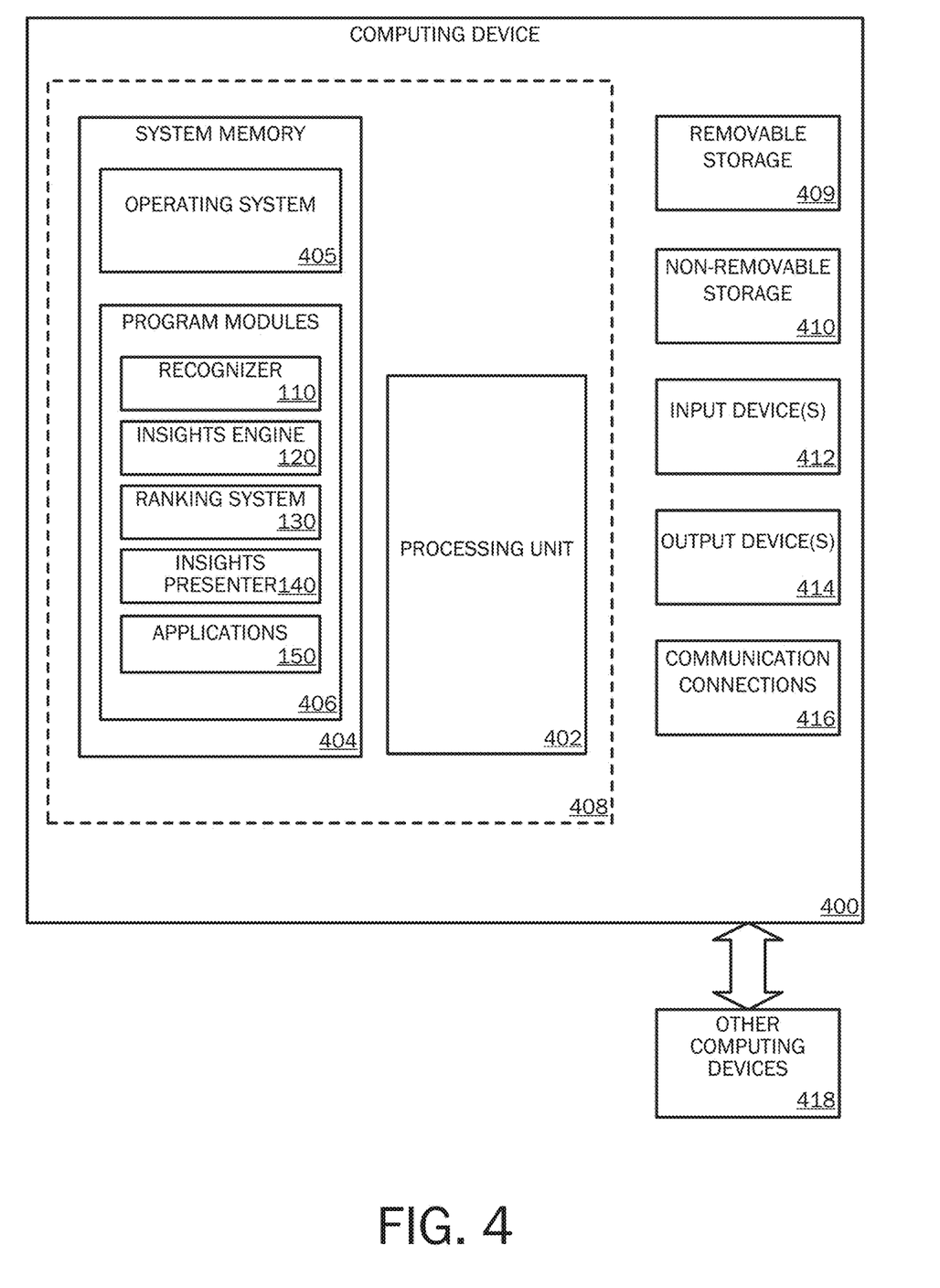
FIG. 4 is a block diagram illustrating example physical components of a computing device with which embodiments of the invention may be practiced.
Figure 5A:
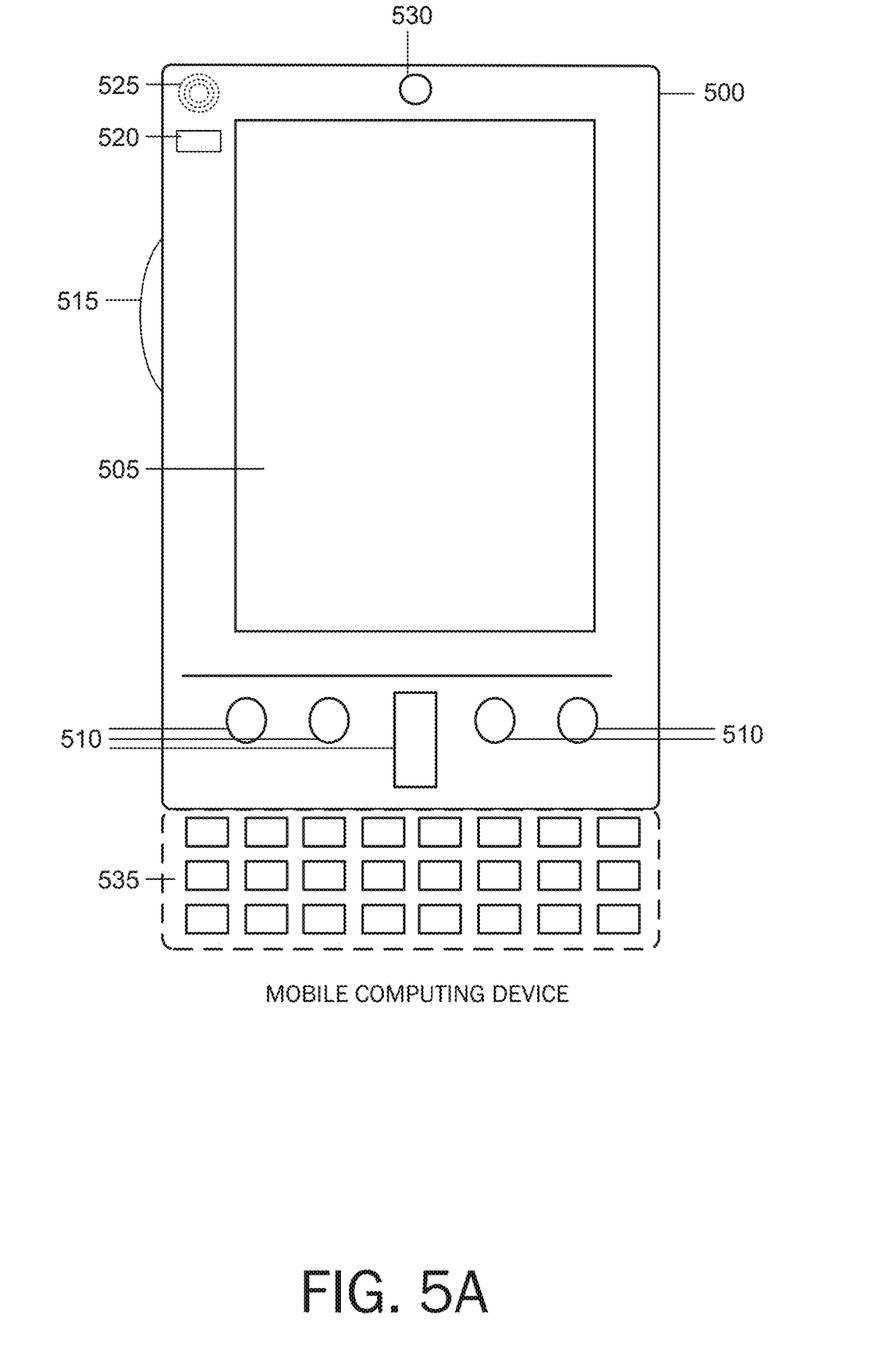
FIGS. 5A and 5B are simplified block diagrams of a mobile computing device with which embodiments of the present invention may be practiced.
Figure 5B:
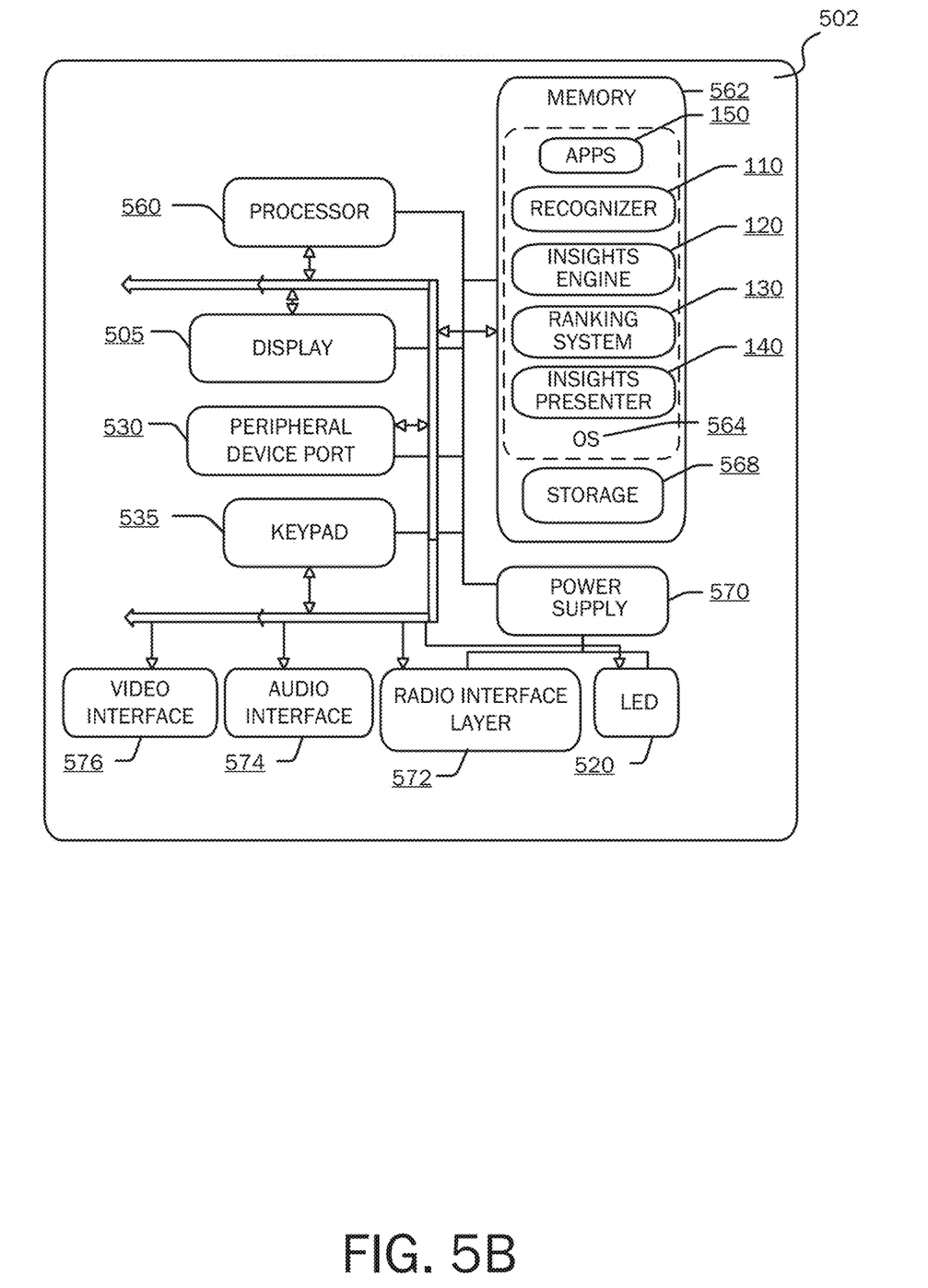
Figure 6:
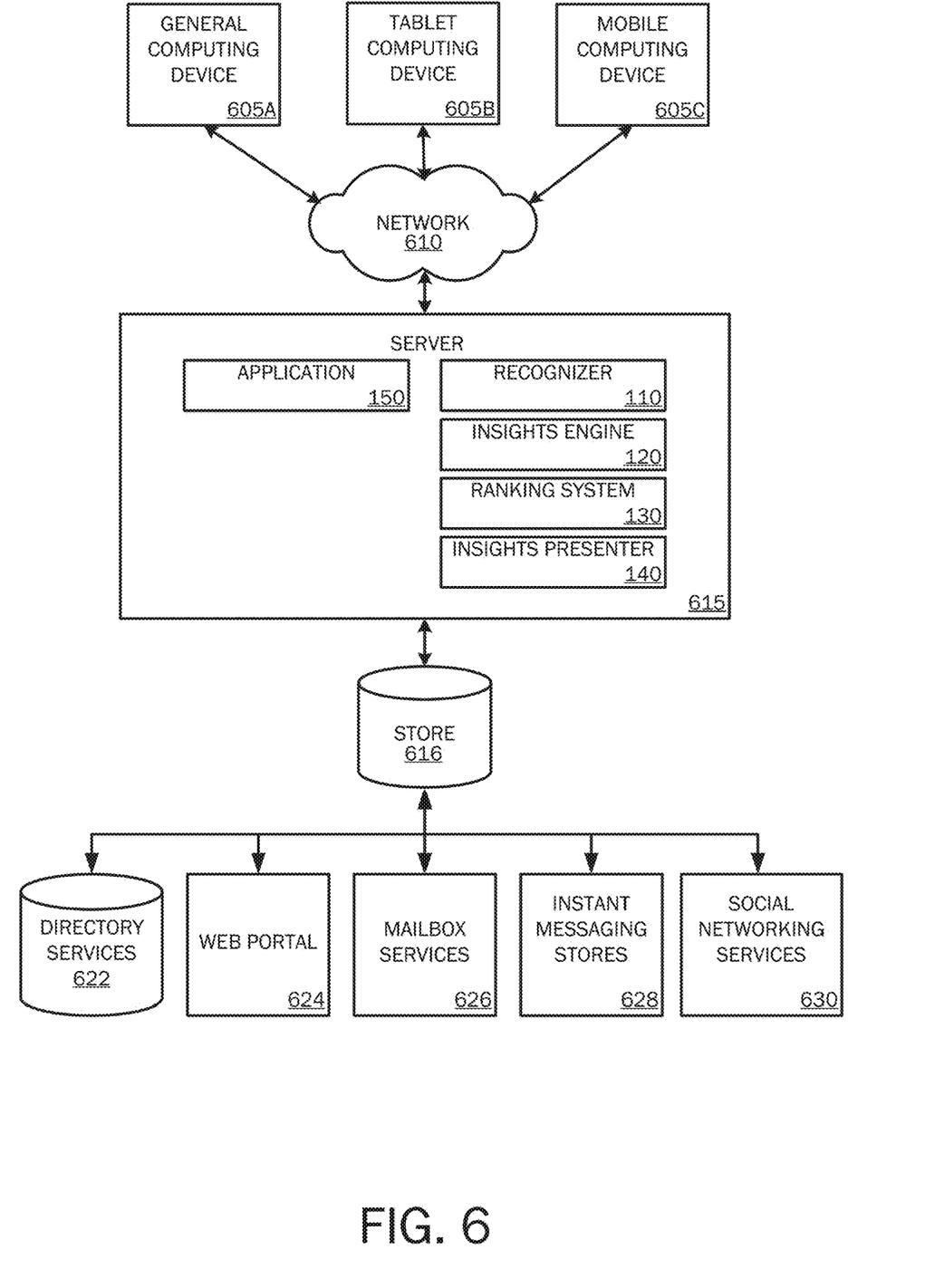
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the client device 125 and/or server described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 150, such as a spreadsheet application, and for running one or more of the recognizer 110, the insights engine 120, the ranking engine 130, and the insights presenter 140. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to automatically identifying insights from a dataset and presenting the insights ranked by importance may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 150 and one or more of the recognizer 110, the insights engine 120, the rating system 130, and the insights presenter 140 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 150 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 150 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for automatically identifying insights from a dataset and presenting the insights ranked by importance, as described above. Content developed, interacted with, or edited in association with the recognizer 110, the insights engine 120, the ranking system 130, the insights presenter 140, or the application 150 may be stored in different communication channels or other storage types. For example, various documents may be stored using a directory service 622, a web portal 624, a mailbox service 626, an instant messaging store 628, or a social networking site 630. The recognizer 110, the insights engine 120, the ranking system 130, the insights presenter 140, or the application 150 may use any of these types of systems or the like for automatically identifying insights from a dataset and presenting the insights ranked by importance, as described herein. A server 130 may provide the recognizer 110, the insights engine 120, the ranking system 130, the insights presenter 140, or the application 150 to clients 125. As one example, the server 130 may be a web server providing the recognizer 110, the insights engine 120, the ranking system 130, the insights presenter 140, or the application 150 over the web. The server 130 may provide the recognizer 110, the insights engine 120, the ranking system 130, the insights presenter 140, or the application 150 over the web to clients 125 through a network 140. By way of example, the client computing device 125 may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A computer-implemented method for generating insights, the method comprising:
   receiving a dataset, the dataset comprising a plurality of data points;
   identifying, using a processor, characteristics of the dataset;
   determining, based at least in part on the characteristics of the dataset, a structure of the dataset;
   performing analyses according to the structure of the dataset;
   identifying, from the results of the analyses, one or more insights;
   ranking the one or more insights according to a strength of each insight within a given insight type and between insight types; and
   presenting the one or more insights according to the ranking of each of the one or more insights.

2. The method of claim 1, wherein receiving data comprises receiving semi-structured data from a spreadsheet or other data source.

3. The method of claim 1, wherein determining a structure of the dataset comprises determining one or more of:
   a numerical dataset;
   a time series;
   an ordinal series;
   a hierarchy; or
   a category.

4. The method of claim 1, wherein presenting the one or more insights comprises:
   generating a chart visually describing each insight;
   generating natural language text describing each insight; and
   presenting the one or more insights in a sequenced list.

5. The method of claim 4, further comprising:
   receiving an indication of a selection of an insight from the sequenced list; and
   displaying the chart visually describing the insight and the natural language text describing the insight.

6. The method of claim 5, further comprising highlighting the data to which the insight pertains in a spreadsheet.

7. The method of claim 5, further comprising:
   receiving an indication of a selection to insert the chart; and
   inserting the chart into a spreadsheet.

8. A system for providing insights, the system comprising:
   one or more processors; and
   a memory coupled to the one or more processors, the one or more processors operable to:
      receive a dataset, the dataset comprising a plurality of data points;
      identify characteristics of the dataset;
      determine, based at least in part on the characteristics of the dataset, a structure of the dataset;
      perform analyses according to the structure of the dataset;
      identify, from the results of the analyses, one or more insights;
      rank the one or more insights according to a strength of each insight within a given insight type and between insight types; and
      present the one or more insights according to the ranking of each of the one or more insights.

9. The system of claim 8, wherein the dataset comprises semi-structured data from a spreadsheet or other data source.

10. The system of claim 8, wherein in presenting the one or more insights, the one or more processors are further operable to:
    generate a chart visually describing each insight;
    generate natural language text describing each insight; and
    present the one or more insights in a sequenced list.

11. The system of claim 10, wherein the one or more processors are further operable to:
    receive an indication of a selection of an insight from the sequenced list; and
    display the chart visually describing the insight and the natural language text describing the insight.

12. The system of claim 11, wherein the one or more processors are further operable to:
    receive an indication of a selection to insert the chart; and
    insert the chart into a spreadsheet.

13. A computer storage media containing computer executable instructions which, when executed by a computer, perform a method for providing insights, the method comprising:
    receiving semi-structured data;
    identifying characteristics of the data;

determining, based at least in part on the characteristics of the data, a structure of the data;

performing a set of analyses according to the structure of the data;

identifying, from results of the analyses, one or more insights;

ranking the one or more insights according to a strength of each insight within a given insight type and between insight types;

generating a chart visually describing each insight;

generating natural language text describing each insight; and presenting the one or more insights in a sequenced list according to the ranking of the insight.

14. The computer storage media of claim 13, wherein determining a structure of the data comprises determining one or more of:

a numerical dataset;
a time series;
an ordinal series;
a hierarchy; or
a category.

15. The computer storage media of claim 13, further comprising:

receiving an indication of a selection of an insight from the sequenced list; and displaying the chart visually describing the insight and the natural language text describing the insight.

16. The computer storage media of claim 15, further comprising:

receiving an indication of a selection to insert the chart; and inserting the chart into a spreadsheet.

* * * * *